(12) United States Patent
Leclec'H et al.

(10) Patent No.: US 10,730,385 B2
(45) Date of Patent: Aug. 4, 2020

(54) TANK WITH INTEGRATED SKIRT

(71) Applicant: Plastic Omnium Advanced Innovation and Research, Brussels (BE)

(72) Inventors: Nicolas Leclec'H, Margny les Compiegne (FR); Herve Guillerme, Thiescourt (FR); Frederic Guignery, Mery-sur-Oise (FR)

(73) Assignee: Plastic Omnium Advances Innovation and Research, Brussels (BE)

( * ) Notice: Subject to any disclaimer, the term of this patent is extended or adjusted under 35 U.S.C. 154(b) by 41 days.

(21) Appl. No.: 15/575,198

(22) PCT Filed: May 19, 2016

(86) PCT No.: PCT/EP2016/061340
§ 371 (c)(1),
(2) Date: Nov. 17, 2017

(87) PCT Pub. No.: WO2016/184990
PCT Pub. Date: Nov. 24, 2016

(65) Prior Publication Data
US 2018/0147934 A1    May 31, 2018

(30) Foreign Application Priority Data

May 19, 2015 (FR) ..................... 15 54448

(51) Int. Cl.
*B60K 15/035* (2006.01)
*B60K 15/03* (2006.01)
*F16K 24/04* (2006.01)

(52) U.S. Cl.
CPC ...... *B60K 15/035* (2013.01); *B60K 15/03177* (2013.01); *B60K 2015/03256* (2013.01);
(Continued)

(58) Field of Classification Search
CPC .. B60K 15/00–035; B60K 2015/03493; B60K 2015/03256; B60K 2015/03542; F16K 24/00–04
See application file for complete search history.

(56) References Cited

U.S. PATENT DOCUMENTS 3,280,372 A * 10/1966 De Pew ............... B64D 37/005
361/212
3,289,876 A * 12/1966 De Pew ............... B64D 37/005
220/246
(Continued)

FOREIGN PATENT DOCUMENTS

CN    103917812    7/2014
CN    104154287    11/2014
(Continued)

OTHER PUBLICATIONS

International Search Report dated Jul. 19, 2016, in PCT/EP2016/061340 filed May 19, 2016.

*Primary Examiner* — Kareen K Thomas
(74) *Attorney, Agent, or Firm* — Oblon, McClelland, Maier & Naustadt, L.L.P.

(57) ABSTRACT

The tank (10) for storing a liquid comprises at least one component (14) including at least one port (22) bringing the inside and the outside of the tank (10) into fluid communication. The component (14) comprises two separate members, namely a first member (16) integral with a wall (12) of the tank (10) and a second member (18) attached to an outer face of the wall (12) of the tank (10).

10 Claims, 3 Drawing Sheets

Figure 1:
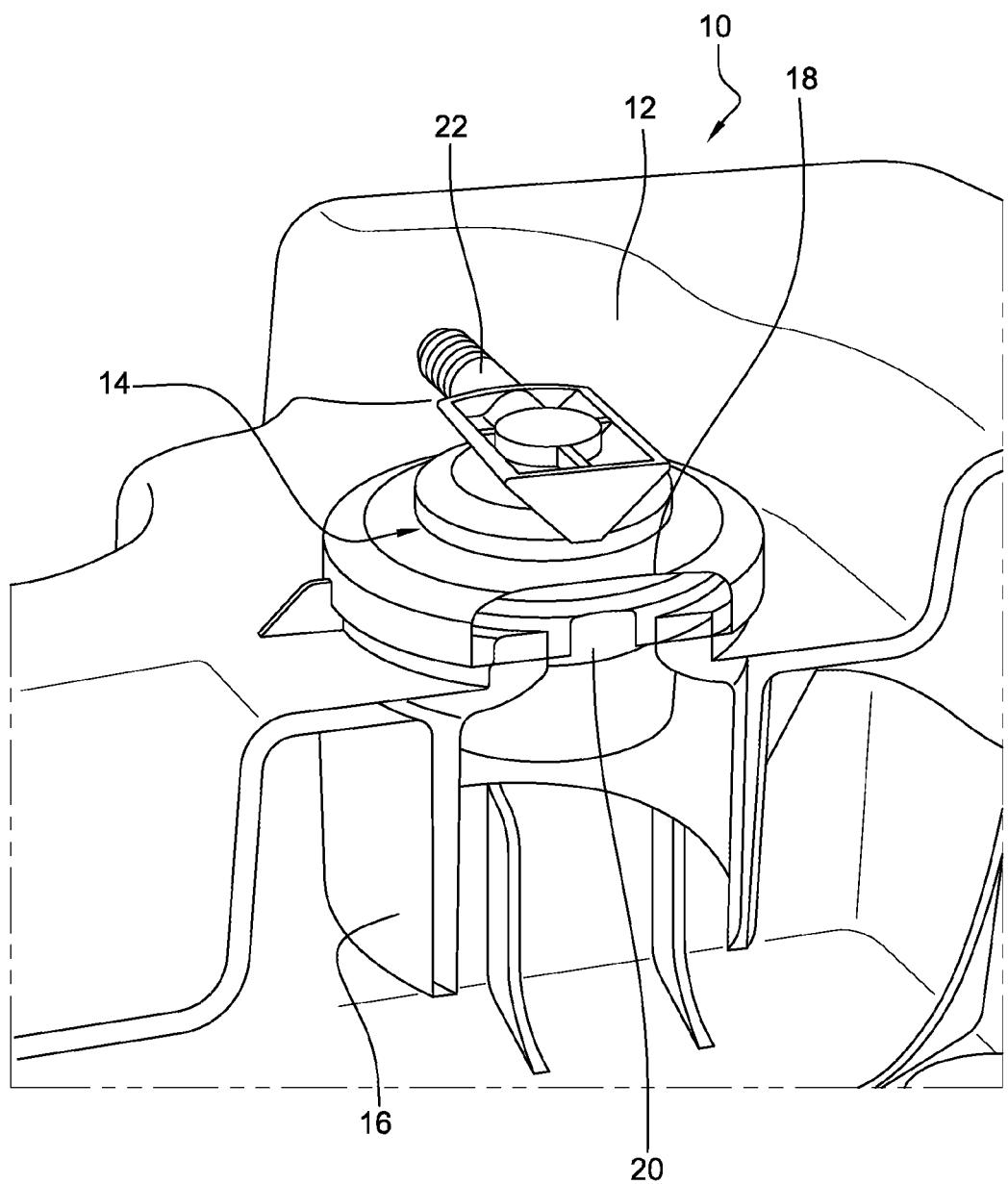

(52) U.S. Cl.
CPC ............... *B60K 2015/03493* (2013.01); *B60K 2015/03542* (2013.01); *F16K 24/04* (2013.01)

(56) References Cited

U.S. PATENT DOCUMENTS

| | | | | |
|---|---|---|---|---|
| 5,279,439 | A * | 1/1994 | Kasugai | B60K 15/0406 |
| | | | | 137/526 |
| 6,003,709 | A * | 12/1999 | Hagano | B60K 15/0406 |
| | | | | 220/203.24 |
| 6,182,693 | B1 | 2/2001 | Stack et al. | |
| 6,274,209 | B1 | 8/2001 | Pagidas et al. | |
| 6,508,374 | B1 * | 1/2003 | Griffin | B60K 15/0406 |
| | | | | 220/288 |
| 6,543,833 | B2 * | 4/2003 | Hagano | B60K 15/0406 |
| | | | | 220/375 |
| 6,701,952 | B1 * | 3/2004 | Ehrman | B60K 15/03519 |
| | | | | 137/202 |
| 6,845,755 | B2 * | 1/2005 | Cook | F16K 31/0675 |
| | | | | 123/458 |
| 7,163,117 | B2 * | 1/2007 | Griffin | B60K 15/0406 |
| | | | | 220/303 |
| 2006/0011173 | A1 | 1/2006 | Davis et al. | |
| 2007/0017918 | A1 | 1/2007 | Kirk et al. | |
| 2009/0151707 | A1 | 6/2009 | Davis et al. | |
| 2010/0032436 | A1 | 2/2010 | Gebert et al. | |
| 2010/0200079 | A1 * | 8/2010 | Matsuzaki | F16K 24/044 |
| | | | | 137/202 |
| 2012/0181274 | A1 | 7/2012 | Fetzer | |
| 2014/0305514 | A1 | 10/2014 | Mihara | |
| 2015/0239198 | A1 * | 8/2015 | Iwata | F16L 23/12 |
| | | | | 138/109 |
| 2016/0288641 | A1 * | 10/2016 | Dusert | B60K 15/04 |
| 2016/0356699 | A1 * | 12/2016 | Poulter | G01N 19/00 |

FOREIGN PATENT DOCUMENTS

| | | |
|---|---|---|
| EP | 1 745 971 A2 | 1/2007 |
| WO | WO 2006/125751 | 11/2006 |

* cited by examiner

TANK WITH INTEGRATED SKIRT

The invention relates to the field of tanks intended for storing liquids and more precisely to the field of motor vehicle fuel or urea tanks.

A fuel tank generally comprises an envelope comprising one or more walls delimiting the tank. It also comprises at least one component allowing the inside and the outside of the tank to be connected in fluid communication. For example, the tank comprises, in a virtually systematic manner, a fuel-filling orifice. Moreover, when the tank is at least partially filled with fuel, fuel vapors accumulate in the tank. It is therefore necessary to evacuate these vapors. To achieve this, at least one venting valve is arranged on a wall of the tank. When the fuel vapor pressure becomes greater than a predetermined threshold, the valve brings the tank and a circuit for venting the tank into fluid communication.

The component is customarily formed in one piece. A first part extends inside the tank. A second part extends outside the tank and is connected to a member outside the tank. This second part is intended to be connected to a suitable member arranged outside the tank. The first part is intended, as a function of its dimensions, to allow the passage of the fuel vapors when the level of fuel is high in the tank.

Each component must therefore be specifically dimensioned according to the function which it is intended to fulfill.

An aim of the invention is to propose a tank which is simpler to manufacture.

To achieve this, there is provided, according to the invention, a tank for storing a liquid, comprising at least one component including at least one port bringing the inside and the outside of the tank into fluid communication, characterized in that the component comprises two separate members, namely a first member integrally formed with a wall of the tank and a second member fixed to an outer face of the wall of the tank.

Thus, during the manufacture of the tank, the first member is dimensioned as a function of the role that it will have to fulfill. The second member, providing fluid communication between the inside and the outside of the tank and being connected to at least one other member outside the tank, can then be produced separately in a standard manner and then be fixed to the wall of the tank. The tank is thus simpler to manufacture.

Preferably, the second member is fixed in a sealed manner to the outer face of the wall of the tank.

According to one embodiment, the component is a valve for venting the tank.

Advantageously, the first member is configured as a skirt.

This shape is easy to obtain, in particular in an injection-molded tank, and makes it possible for a venting valve adapted to the dimensions of the tank to be produced in a simple manner.

Preferably, the skirt has a transverse dimension which is greater than the largest dimension of an opening of the wall of the tank, around which opening the skirt is positioned.

In the prior art, when the skirt was integrally formed with the first member, it necessarily had a transverse dimension which was less than or equal to the diameter of the opening so as to be able to pass through this opening when fitting the component on the tank. From now on, the skirt can have a larger transverse dimension since it is no longer necessary to introduce it into the tank through the opening. Thus, it can be housed in a part of the tank of which a dimension between two walls is smaller. It is therefore possible to position the component at locations of the tank which were previously inaccessible.

According to one embodiment, the skirt extends inside the tank.

Advantageously, the second member is fixed by screwing.

Preferably, the second member is fixed by welding.

According to one embodiment, the second member is fixed by overmolding.

Advantageously, the tank comprises walls of plastic which are formed by injection-molding.

Preferably, the tank is intended to be used for storing fuel of a motor vehicle.

Figure 2:
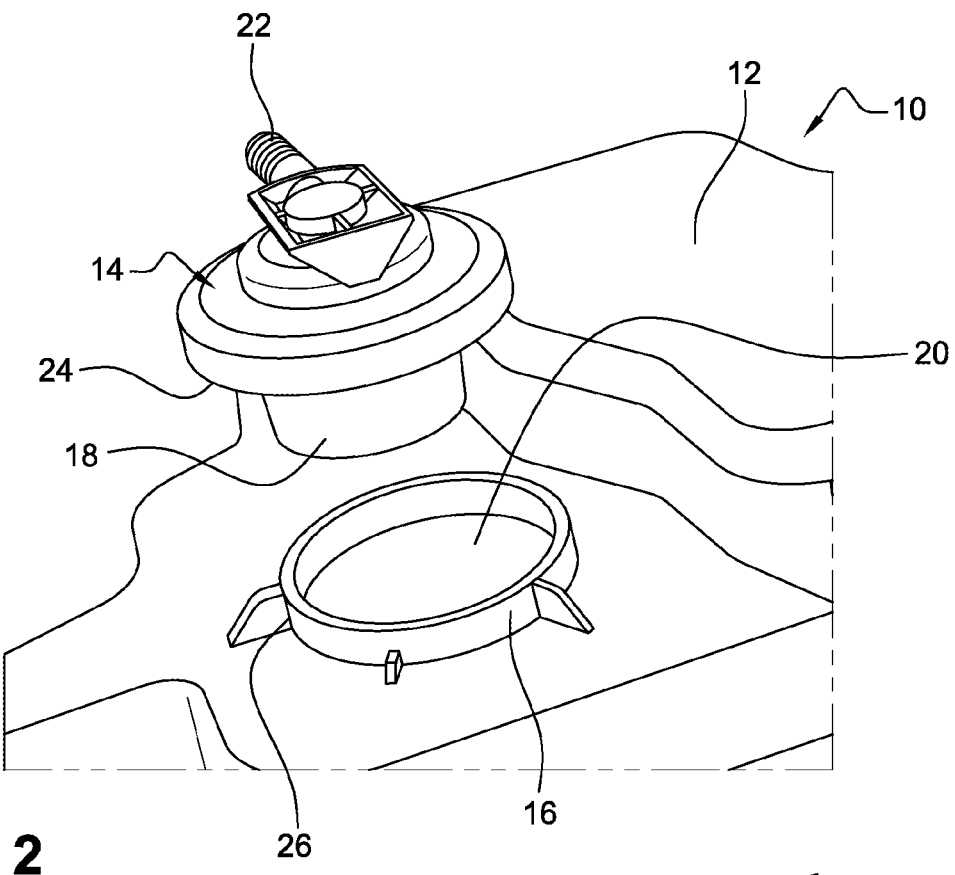
Figure 3:
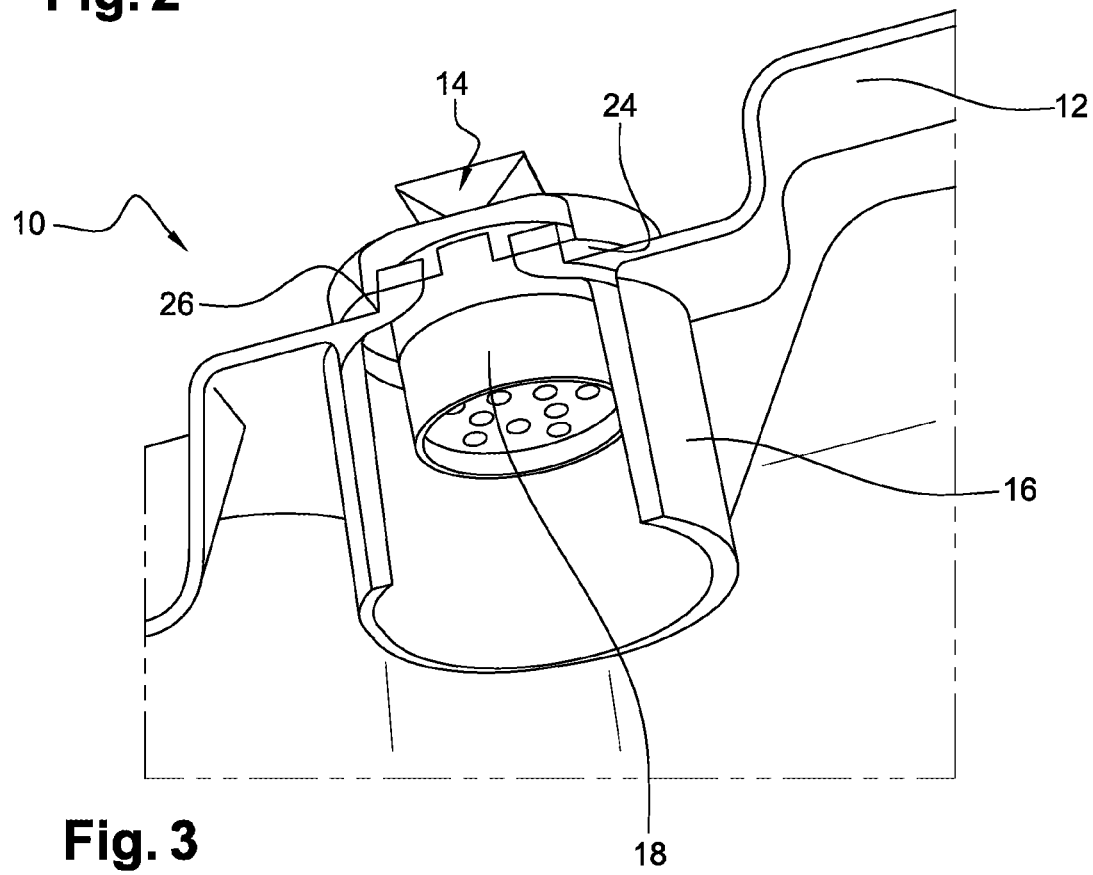
Figure 4:
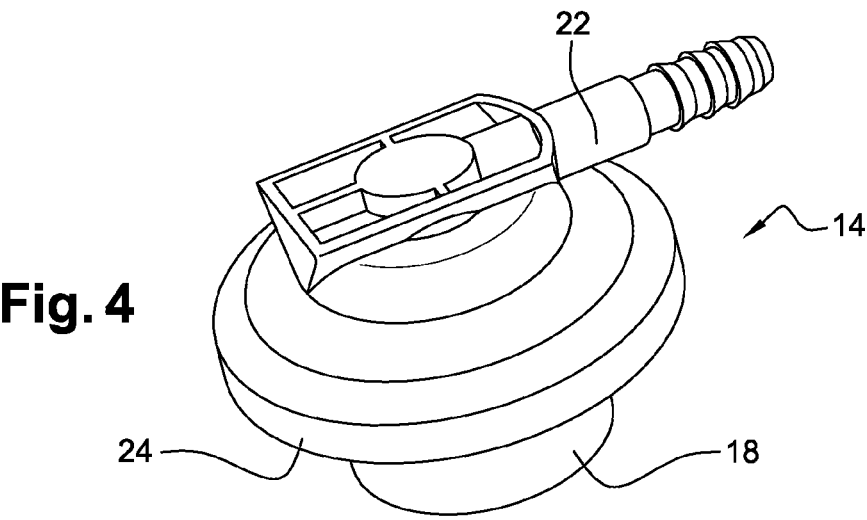
Figure 5:
Figure 6:
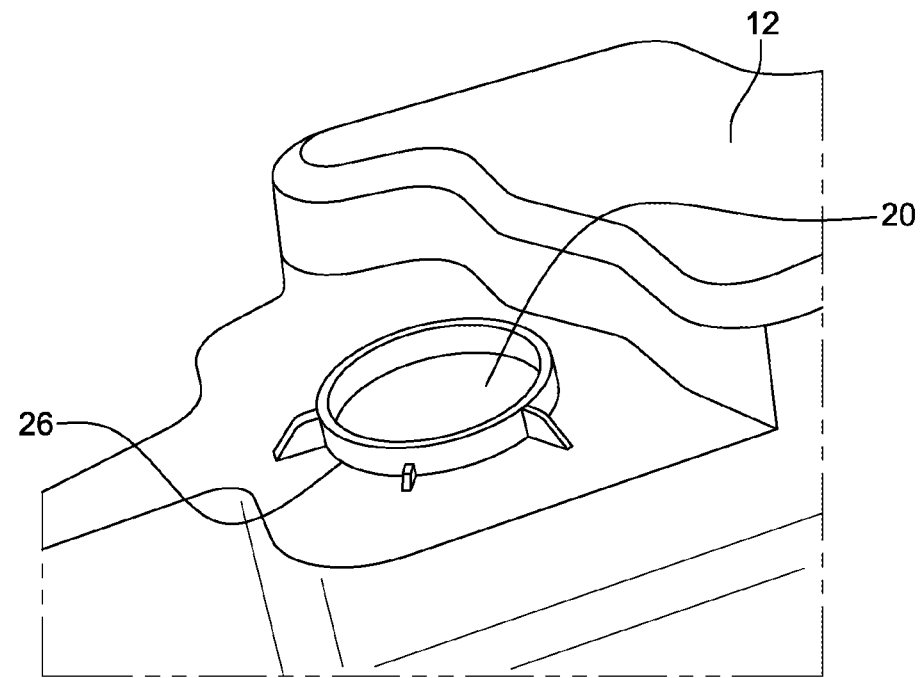

A description will now be given, by way of nonlimiting example, of an embodiment of the invention with the aid of the following figures:

FIG. 1 is a perspective and sectional view of a tank according to the invention, FIG. 2 is an exploded perspective view of the tank, FIG. 3 is a perspective and sectional view at another angle of the tank, and FIGS. 4 and 5 are perspective views at two different angles of a component according to the invention FIG. 6 is a perspective view of a part of a wall of the tank.

FIG. 1 shows a tank 10 for storing a liquid according to the invention. What is concerned here is a tank 10 intended to be used for storing fuel of a motor vehicle. The fuel which it contains is therefore intended to be used for supplying the engine of the vehicle. The tank 10 is connected, on the one hand, to the engine and, on the other hand, to means for filling the tank with fuel.

The tank 10 comprises a wall 12 made of a plastic, for example of the high-density polyethylene (HDPE) type. Here, the walls of the tank have been formed by injection-molding.

The tank 10 also comprises a component 14, which is here a valve for venting the tank 10. According to a variant, the component 14 is a device for filling the tank 10. When the fuel vapor pressure becomes greater than a predetermined threshold in the tank 10, the valve brings the inside and the outside of the tank 10 into fluid communication. Here, the valve brings the inside of the tank 10 into fluid communication with a system intended to treat the fuel vapors.

The component 14 comprises two separate members: a first member 16 and a second member 18.

The first member 16 is integrally formed with the wall 12 of the tank 10. It is here configured so as to form a skirt extending inside the tank 10. Advantageously, the length of the skirt is fixed as a function of a maximum liquid level allowed in the tank.

The first member 16 configured as a skirt is positioned around a circular opening 20 of the wall 12 of the tank 10. As can be seen in FIGS. 1 and 3, the skirt has a transverse dimension which is greater than a dimension, here the diameter, of the opening 20 of the wall 12 of the tank 10.

Furthermore, the component 14 comprises a port 22, visible in FIGS. 1 to 5, situated outside the tank and able to bring the inside and the outside of the tank into fluid communication. The second member 18 is here integrally formed with the port 22.

The second member 18 is fixed in a sealed manner to the outer face of the wall 12 of the tank by welding. To achieve this, the second member 18 comprises a circular welding zone 24, visible in FIGS. 2 to 5, opposite a likewise circular welding zone 26, visible in FIGS. 2, 3 and 6, of an outer face of the first member 16. The welding zones of the first 16 and second 18 members have complementary shapes. Here, hot-plate welding has been carried out. According to a variant of the present embodiment, it is possible to carry out all types of welding, in particular ultrasound or laser welding.

According to other variants of this embodiment, the second member 18 is fixed in a sealed manner to the outer face by screwing or, according to another variant, by overmolding.

Thus, the main advantage of the invention concerns the simplicity of manufacturing the tank 10. Specifically, during the formation of the tank 10 by injection-molding, the walls 12 of the tank 10 are configured while arranging as many skirts as necessary, which are integrally formed with the walls 12 of the tank 10. The dimensions of each skirt are adapted to the function that the component 14 which incorporates this respective skirt will have to fulfill. Subsequently, the second, standardized member is arranged around each opening 20 around which a skirt is arranged, in a sealed manner.

In one particular embodiment, the second member 18 comprises a liquid/vapor separation membrane.

Of course, numerous modifications may be made to the invention without departing from the scope thereof.

By taking particular precautions, and if the material constituting the wall of the tank allows, it is possible to conceive of the skirt being obtained by deforming a hot parison during blow-molding and shaping thereof, or else by welding a cylindrical part to the hot parison during shaping thereof.

Various techniques may be used to manufacture the walls 12 of the tank 10.

The shape of the first member 16 may also be modified.

The invention claimed is:

1. A tank for storing a liquid of a motor vehicle, comprising at least one component comprising at least one port bringing an inside and an outside of the tank into fluid communication, wherein the component comprises two separate members, a first member integrally formed with a wall of the tank and a second member fixed in a sealed manner to an outer face of the wall of the tank, wherein the first member is configured as a skirt and wherein the skirt extends inside the tank and has a transverse dimension which is greater than a largest dimension of an opening of the wall of the tank around which opening the skirt is positioned.

2. The tank as claimed in claim 1, wherein the component is a valve for venting the tank.

3. The tank as claimed in claim 1, wherein the second member is fixed by screwing.

4. The tank as claimed in claim 1, wherein the second member is fixed by welding.

5. The tank as claimed in claim 1, wherein the second member is fixed by overmolding.

6. The tank as claimed in claim 1, comprising walls of plastic which are formed by injection-molding.

7. A motor vehicle comprising the tank as claimed in claim 1.

8. The tank as claimed in claim 1, wherein the skirt extends inside the tank.

9. A method of storing fuel in a motor vehicle comprising equipping the motor vehicle with the tank as claimed in claim 1 and filling the tank with fuel.

10. A method of storing urea in a motor vehicle comprising equipping the motor vehicle with the tank as claimed in claim 1 and filling the tank with fuel.

* * * * *